United States Patent [19]

Ali et al.

[11] Patent Number: 5,896,411
[45] Date of Patent: Apr. 20, 1999

[54] ENHANCED REVERSE LINK POWER CONTROL IN A WIRELESS COMMUNICATION SYSTEM

[75] Inventors: Farhan Ali, Escondido, Calif.; Alberto Gutierrez, Plano, Tex.; Kim Chang, Richardson, Tex.; Chenhong Huang; Serge Manning, both of Plano, Tex.

[73] Assignee: Northern Telecom Limited, Montreal, Canada

[21] Appl. No.: 08/998,542

[22] Filed: Dec. 26, 1997

Related U.S. Application Data

[60] Provisional application No. 60/045,564, May 5, 1997.

[51] Int. Cl.$^6$ .................................................. H04B 15/00
[52] U.S. Cl. ............................ 375/200; 455/522; 455/69
[58] Field of Search ............................. 375/200; 455/522, 455/69, 68

[56] References Cited

U.S. PATENT DOCUMENTS

| | | | |
|---|---|---|---|
| 5,093,840 | 3/1992 | Schilling | 375/1 |
| 5,465,399 | 11/1995 | Oberholtzer et al. | 455/69 |
| 5,487,174 | 1/1996 | Persson | 455/33.2 |
| 5,564,074 | 10/1996 | Juntti | 455/67.1 |
| 5,566,201 | 10/1996 | Ostman | 375/200 |
| 5,574,747 | 11/1996 | Lomp | 375/288 |
| 5,574,984 | 11/1996 | Reed et al. | 455/69 |
| 5,603,096 | 2/1997 | Gilhousen et al. | 455/69 |
| 5,752,197 | 5/1998 | Rautiola | 455/522 |

Primary Examiner—Stephen Chin
Assistant Examiner—Mohammad Ghayour
Attorney, Agent, or Firm—Bruce E. Garlick

[57] ABSTRACT

An enhanced mechanism for the reverse link power control in a wireless communication system, especially for high speed data applications and fixed wireless communication applications, dynamically adjusts the power control step size of the reverse link power control. The power control step size is dynamically adjusted based on various factors including types of service, number of reverse supplemental code channels, total received power at the base station, estimated diversity gain and required mobility, among others. The system which includes stationary infrastructure, can query a subscriber unit's capability in the support of a pre-defined set of power control step sizes before assigning it to the subscriber unit. Furthermore, the subscriber unit may decide its optimized power control step size based on certain feedbacks from the system. In a specific embodiment, enhancement to the ANSI EIA/TIA-95 system is provided such that it supports a variable subscriber unit power control step size and associated signaling in accord with this invention.

38 Claims, 6 Drawing Sheets

ENHANCED REVERSE LINK POWER CONTROL IN A WIRELESS COMMUNICATION SYSTEM

CROSS-REFERENCE TO RELATED APPLICATION

The present application claims priority pursuant to 35 U.S.C. Sec. 119(e) to U.S. Provisional Application Ser. No. 60/045,564, filed May 5, 1997, now abandoned, now which is hereby incorporated herein by reference in its entirety.

FIELD OF THE INVENTION

The present invention relates in general to wireless communication systems and in particular to systems in which the power of reverse link transmissions is modified dynamically.

BACKGROUND OF THE INVENTION

A wireless communication system typically consists of one or more base stations providing communications coverage over a service area to one or more Subscriber Units (SUs). Each SU, which may be stationary or moving within the service area, establishes wireless links with one or more base stations. Communications are transmitted by the base station to the SU on the forward link and communications are transmitted by the SU to the base station on a reverse link. The forward link and the reverse link are normally separated by a frequency which limits interference between transmitters and receivers.

Different radio frequency technologies may be used in a wireless communication system. One example is Code Division Multiple Access (CDMA). In typical CDMA systems, many users communicate over the same frequency channel with different communication links being identified by an unique set of modulation codes. For a given user, transmissions by other users appear as noise with respect to the given user's signal at the base station receiver. For the receiver to be able to successfully decode the transmission from a particular user, the intended signal must be of sufficient strength when compared to the "noise" from transmissions by other SUs. For this reason, the power level at which SUs transmit is very important.

CDMA systems are an example of wireless systems where it is important for each base stations to control the transmit power received from SUs communicating over reverse links. The means by which the base station controls the transmit power over reverse links is called Reverse Link Power Control. The goal of Reverse Link Power Control is to keep each SU transmitting at the absolute minimum power level necessary to ensure an acceptable service quality. The number of simultaneous users that the system can support depends greatly on how precisely the transmit power of all users can be maintained at ideal levels. If a SU transmits at excessive power, it increases the interference to the transmissions of other SUs. Transmission at higher than required levels also impacts negatively on the battery life of SUs.

The importance of Reverse Link Power Control is further exacerbated by high speed data (HSD) reverse links that use multiple code channels. For high speed data reverse links, several code channels are used simultaneously by a given SU to provide a high data rate. As the Reverse Link Power Control mechanism adjusts the transmit power on the reverse link, the power level of all code channels assigned to an SU change in unison. This increases the variance of the received power level at the receiver and this increase may cause a degradation in service quality as well as a negative impact on the system radio capacity.

RELATED ART

A well known prior art Reverse Link Power Control mechanism is that which is found in IS-95 systems. The IS-95 reverse link power control mechanism consists of two parts: Open Loop Power Control and Closed Loop Power Control. The open loop control is used to adjust the SU transmit power based on the received power from the base station. Assuming the received power is a coarse measure of the path and that the radio environment is reciprocal in both links, the SU adjusts its reverse link transmission to this estimated power level.

However, because of the frequency separation between reverse and forward links, the multipath fading of the two links are independent. To account for this difference of multipath fading and to further control the SU's transmit power to be received at the Base Station for a desired level, another mechanism called "Closed Loop Power Control" is used in addition to the open loop power control. In the Closed Loop Power Control mechanism, the base station demodulates the reverse link and determines the signal-to-noise ratio (SNR) of the intended user. If it is lower than a desired level, the base station directs the SU to raise its transmit power. Otherwise, a power adjustment command is sent to lower the SU's transmit power. The update of SU transmit power, specified at 800 times per second in IS-95, is realized by the puncturing power control bits on the corresponding forward link channel. Each power control bit when received by the SU will dictate an increase or decrease of the transmit power by the SU.

A significant part of the Closed Loop Power Control mechanism is the specification of a fixed change per update of SU transmit power upon receiving the power control bits on the forward link. For example, in IS-95 this fixed value is set at 1 dB. In other words, every time the SU receives a power control bit it either increases or decreases its transmit power by 1 dB, depending on the value of the bit ("0" means increase, and "1" decrease"). The bit is set based on the received power at the Base Station from the SU. The 1 dB fixed change per power control step as specified in IS-95 is chosen based on compromises of different radio environment, ranging from a stationary SU to a high speed vehicle.

Recently, the wireless communication industry began to venture into the High Speed Data (HSD) market. In order to satisfy the market need, the IS-95 system has also started a similar evolution. The very first approach toward HSD capability is to aggregate code channels on both the reverse and forward links in order to provide data rate of up to 8 times of a single code channel. For example, according to the ANSI TIA/EIA-95 standard, which is the latest revision of IS-95 standards, the maximum data rate of a rate set 2 code channel is 14.4 kbps. Aggregating 8 reverse link code channels from a single SU will provide a maximum of 115.2 kbps. Furthermore, it is specified that among the multiple code channels on both links, only 1 code channel will be dedicated as the "fundamental" channel for voice, data, and messaging purposes, and the rest are pure data channels operating always at the full rate.

One significant problem with this approach relates to the reverse link Closed Loop Power Control mechanism is the fact that the power control bit is only punctured on the forward fundamental channel. Each power control bit will have to control and adjust the transmit power of all of the coded channels on the reverse link. In other words, now the change of transmit power of the coded channels from the same SU will happen in a unison fashion, increasing or decreasing the transmit power at the same instantaneous time by the coded channels. This may increase the variance of base station received power (or signal to noise level) from the SU and consequently may cause degradation of service quality as seen by other users in the same coverage area. Increased variance may also impact in a negative fashion the stability and capacity of the system.

Thus, there is a need in the art for a system and method of operation to better control reverse link power levels so that multiple reverse link transmissions from the SU to the base station do not negatively impact system operation.

SUMMARY OF THE INVENTION

A wireless communication system implemented according to the present invention facilitates wireless communication with at least one subscriber unit (SU) operating within a respective service area. In one embodiment, the wireless communication system includes a base station and provides wireless communication capability to a plurality of SUs operating in its respective service area. In the embodiment, the base station establishes communications on both the forward link and reverse link with an SU. Communications are transmitted to the SU on the forward link and communications are received from the SU on the reverse link.

In managing the reverse link received power, the base station commands the SU to incrementally alter the reverse link transmit power by a power control step size. In one embodiment, the base station performs such a task by sending periodic power control bits to the SU. According to the present invention, the power control step size may be dynamically determined and assigned by the base station based upon various system conditions. In general, by allowing the system to configure reverse link power control step sizes, the variance about the mean power level received at the base station can be reduced, thus reducing the negative impact that the SUs have on the system due to power stepping. The benefits include improved system stability, improved quality of service, and increased system capacity on the reverse link.

In one embodiment of the present invention, the SUs are required to support a predetermined set of power control step sizes. For example, according to the ANSI TIA/EIA-95 standard which incorporates the enhancements based on the present invention, SUs may support power control step sizes of 0.25 dB, 0.50 dB, and 1.0 dB. However, in other embodiments, other step sizes may be supported. To determine the power control step sizes supported by the SUs, the base station may query each SU so that the SU indicates the power control step sizes it supports. However, in another embodiment, each SU may support its own step size, such step size based upon predetermined system conditions in which the SU operates. For example, SUs providing FWA service may support relatively smaller step sizes while fully mobile SUs may support relatively larger step sizes.

The base station considers various system conditions such as the mobility requirements of each SU, the applications supported, and other relevant system conditions, such that it can dynamically set the power control step size for each SU. The mobility requirements may differ for the SUs operating in the wireless communication system as some of the SUs may be stationary or fixed, some of the SUs may be slowly moving, such as when used by a pedestrian, and some of the SUs may be moving rapidly with respect to the base station. In one embodiment, the wireless communication system may support FWA SUs which are fixed in mobility within the service area. In such operation, the system may configure the FWA SUs at optimized power control step sizes to increase system capacity and performance.

Furthermore, the applications supported may differ for different SUs as some of the SUs may only support voice service, some SUs may support only High Speed Data (HSD) service, and others may support multimedia service such as simultaneous voice and HSD. In one embodiment, where the wireless communication system operates in compliance with IS-95 standards, an SU may support HSD service by transmitting on multiple reverse code channels. In determining the power control step size, the system may consider the number of reverse code channels currently allocated to the SU. When multiple reverse link code channels are allocated, the base station may direct the SU to use an appropriate power control step size. In doing so, the variance about the mean power level at the base station caused by unison power stepping of the reverse code channels can be reduced. Furthermore, as HSD channels are allocated and later deallocated again, the power control step size may be adjusted accordingly.

In directing each SU to adjust respective reverse link power levels, the base station may direct each SU to adjust respective reverse link power levels by assigning the power control step size in various forward link messages. Based on the present invention, a base station complying with the ANSI TIA/EIA-95 standard may send a Power Control Message to an SU to cause the SU to adjust its power control step size. Furthermore, the base station may also direct the SU to adjust its step size in other messages as well, such as the Extended Channel Assignment Message, the General Handoff Direction Message and the Supplemental Channel Assignment Message. In determining the capabilities of each SU, the base station may issue a Status Request Message to the SU, requesting the SU to respond with a Status Response Message or an Extended Status Response Message with the Power Control Information Record included. In the Power Control Information Record, the SU indicates to the base station the step sizes which it supports. Based upon this information, the base station further may direct the SU to set its power control step size as appropriate based upon system conditions. The root of the problem of the prior systems is the fixed value reverse link Closed Loop Power Control step size. For HSD applications, the ability to change the power control step size from 1 dB to a smaller value will significantly improve the performance as well as capacity of a system, as proved by our analysis and simulations. Especially in a system with mixed traffic, the ability of adjusting the power control step size will not only improve the performance of the HSD SUs but also the voice users. Preliminary simulation results indicate that the required reverse link SNR can be significantly reduced if a smaller step size is used.

Another inherent benefit of a Closed Loop Power Control mechanism with adjustable power control step size is the optimization of system performance and capacity based on the radio environment characteristics, even for a system that does not have HSD users. For example, in a fixed wireless access (FWA) environment where all the users are stationary, a 1 dB step size, being a compromised value designed to satisfy all environments, may be too large. The enhanced reverse link power control mechanism with an adjustable power control step size will significantly benefit HSD applications, FWA applications, as well as pure voice systems, because the power control mechanism is optimized and adjusted based on the radio environments. Especially for CDMA systems, this enhanced mechanism introduces the flexibility in SU power control which optimizes system performance.

Moreover, other aspects of the present invention will become apparent with further reference to the drawings and specification which follow.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF THE DRAWINGS

The principles of the present invention and their advantages are best understood by referring to the illustrated embodiment depicted in FIGS. 1–6 of the drawings, in which like numbers designate like parts.

Figure 1:
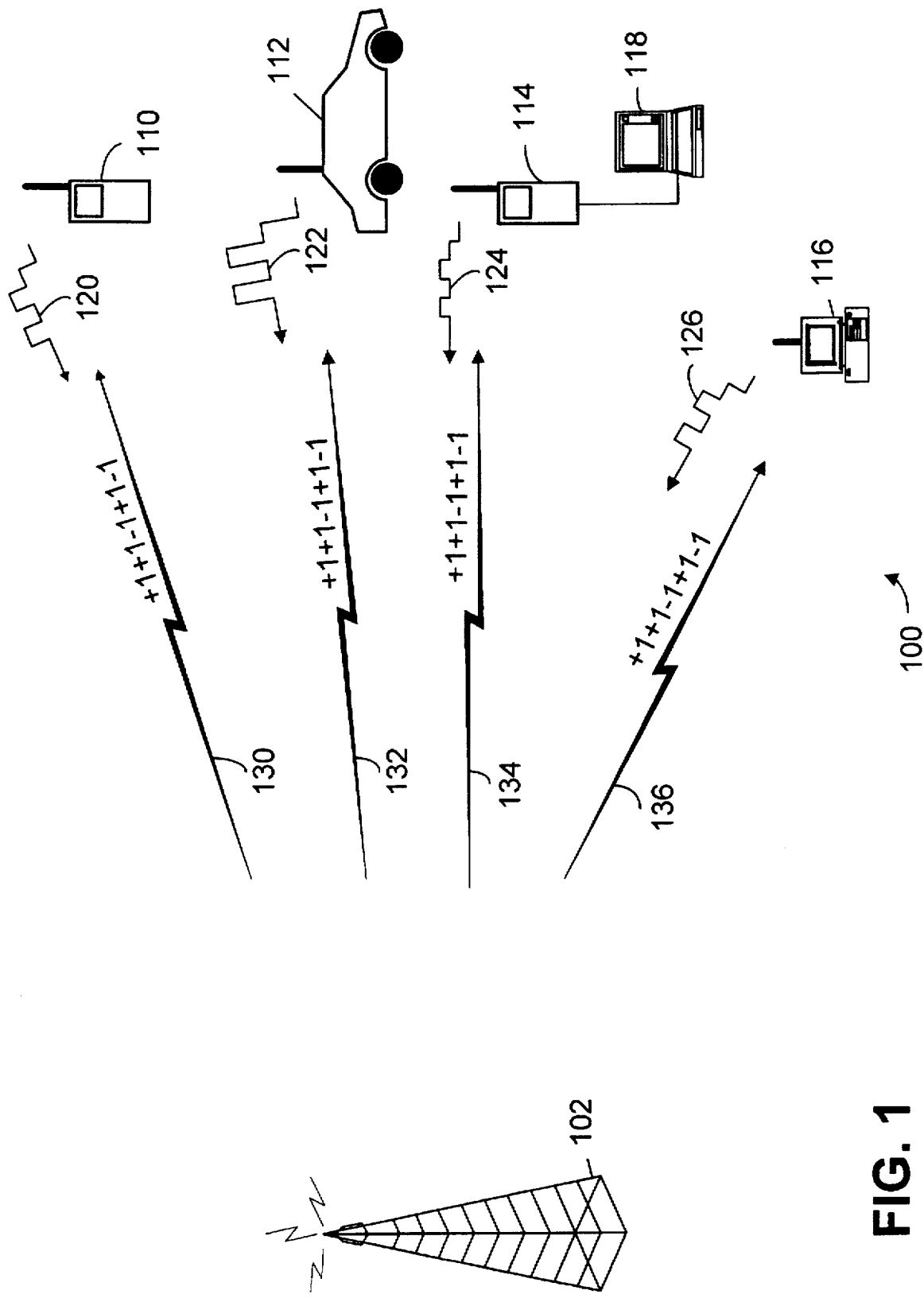
FIG. 1 is a diagram illustrating a wireless communication system implemented according to the present invention in which reverse link power control step sizes of a plurality of subscribing units are independently controlled by a base station based on various system conditions and application types.

FIG. 1 is a schematic diagram illustrating a wireless communication system 100 implemented according to the present invention in which reverse link power control step sizes of a plurality of SUs are dynamically controlled by a base station 102 based upon system conditions according to the present invention. In the particular wireless communication system 100, the base station 102 operates according to the code division multiple access (CDMA) protocol as per ANSI TIA/EIA-95. Thus, a plurality of subscribing units (SUs) 110, 112, 114 and 116, operating within the service area, communicate with the base station 102 according to the CDMA protocol. However, in other embodiments, the base station 102 and the SUs may operate according to various other communication protocols. In still further embodiments, the base station 102 and the SUs may operate according to multiple communication protocols.

As shown, the SUs 110, 112, 114 and 116 are in communication with the base station 102. The SU 110 is a hand-held unit and may be stationary or have the mobility of, for example, a pedestrian. SU 112 is located within a vehicle and has relatively higher mobility. SU 114 provides HSD capability for a connected computer 118. Finally, SU 116 is a fixed terminal supporting FWA applications.

The SU 110 operates in conjunction with the base station 102 to adjust its transmit power on the reverse link 120. The base station 102 commands the SU 10 by sending periodic power control bits to adjust its transmit power on the reverse link 120 by a particular power control step size. In determining the power control step size, the base station 102 considers various system conditions. As will be more fully described herein, various factors may be used in determining the reverse link Closed Loop Power Control step size. For example, mobility or relative motion of the SUs with respect to the base station 102 may require a differing step size for each of the SUs. As is shown, SU 116 is stationery within the service area. However, SUs 110, 112 and 114 may be mobile within the service area at any point in time. Based upon the difference in mobility, different power control step sizes may be required. Additionally, the number of SUs operating within the wireless communication system 100 may also affect selection of the step size.

Moreover, the services supported by the base station 102 may also affect the power control step sizes chosen. For example, in supporting HSD services in compliance with the ANSI TIA/EIA-95 standard, multiple code channels on the reverse link may be established between an SU and the base station 102 to provide sufficient data transmission bandwidth. Thus in order to maintain a desired power level received at the base station and to reduce the variance about the mean power level at the base station caused by unison power stepping of the multiple reverse link code channels, the base station 102 determines and assigns the appropriate power control step sizes. As shown in FIG. 1, SU 114, connected to a computer 118, supports HSD services and communicates with the base station 102 via forward link 134 and two reverse code channels on the reverse link 124. However, SU 110, 112, and 116 may support other services which require relatively lower data rates thus may only require one code channel on the reverse link. Hence, the reverse link power control step size assigned for each SU may be different due to the different data rate requirement and the different number of code channels transmitted by each SU.

As illustrated in FIG. 1, the transmit power on reverse link 120 corresponding to the SU 110 is adjusted based upon power control bit sequence +1,+1,−1,+1,−1, etc. received via forward link 130. Note that for illustrative purposes, +1 corresponds to a power control bit of "0" and thus an increase in power, and −1 corresponds to a power control bit of "1" and a decrease in power. Likewise, transmit power on reverse link 122 corresponding to the SU 112 is adjusted based upon power control bit sequence +1,+1,−1,+1,−1, etc. received via forward link 132. For illustrative purposes, the power control bit sequence is identical for each SU 110, 112, 114 and 116 in this example. However, in typical scenarios, since each power control bit sequence corresponds to a particular SU, each power control bit sequence will typically differ from other power control bit sequences. As shown, because the reverse link power control step size corresponding to the SU 112 is relatively larger than the reverse link power control step size corresponding to the SU 110, 114 or 116, the reverse link 122 corresponding to the SU 112 will exhibit greater differences in reverse link transmit power at each adjustment.

Further, as also shown, the reverse link transmit power 124 corresponding to the SU 114 varies less at each adjustment than does the reverse link power 126 corresponding to the SU 116 and the reverse link power 120 corresponding to the SU 110 due to the relatively smaller reverse link power control step size selected for the SU 114. Such may be the case since the SU 114 provides HSD service which may require transmissions on multiple reverse code channels.

Figure 2A:
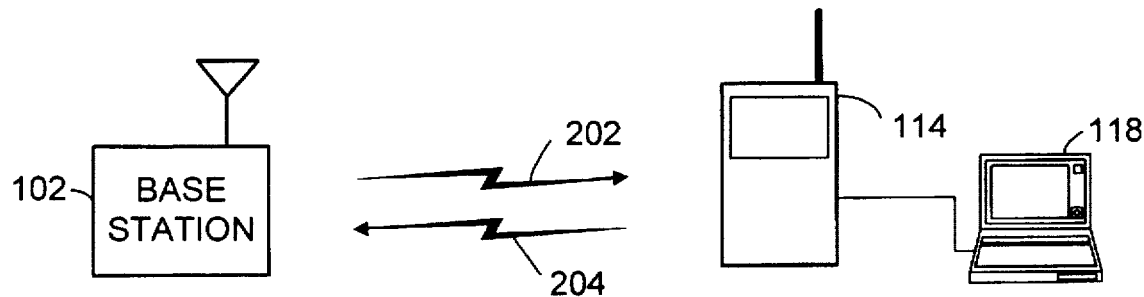
FIGS. 2A through 2C are diagrams illustrating a base station and a subscriber unit, implemented according to the present invention, in which the number of reverse link code channels varies over time to provide variable bandwidth.
Figure 2B:
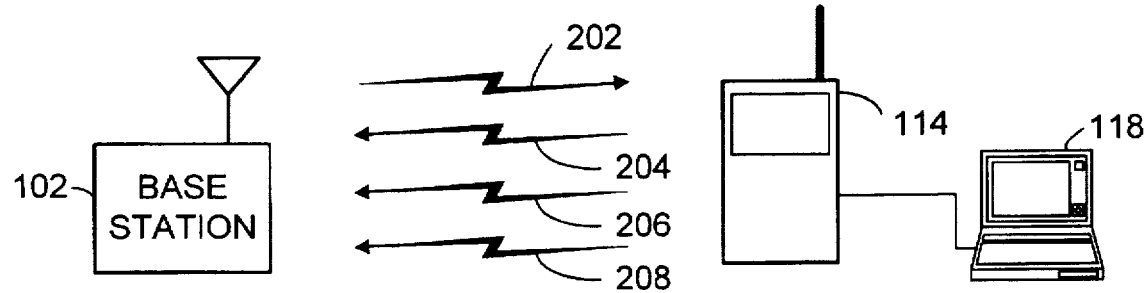
Figure 2C:
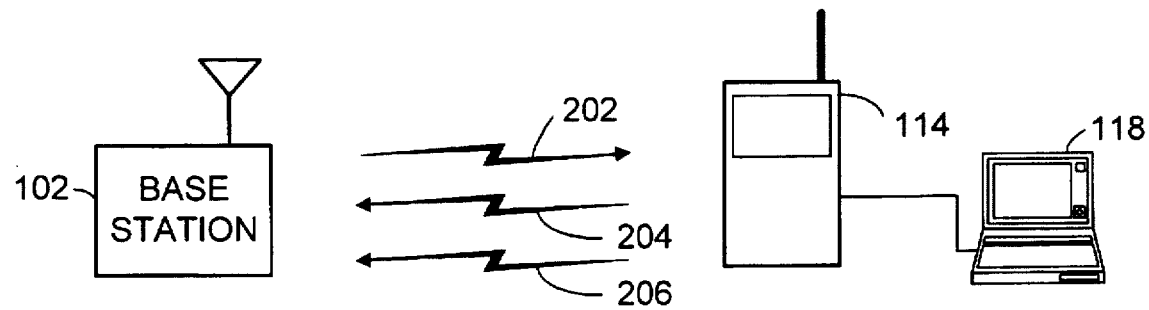

FIGS. 2A through 2C further illustrate how power control step sizes may be adjusted over time according to the number of reverse link code channels established between the base station 102 and the SU 114 supporting HSD services. The SU 114 provides wireless data transmission capabilities and serves as a bridge for data communications between the computer 118 and base station 102. As shown in FIG. 2A, a forward link 202 and a code channel 204 on the reverse link provide sufficient data rate between the base station 102 and the SU 114. However, when the computer 118 requires higher data rate for communication to the base station 102, more reverse link code channels may be established. As shown in FIG. 2B, two more reverse link code channels, 206 and 208, are established.

As the number of reverse link code channels established from the SU 114 to the base station 102 is increased, the variance about the mean power level at the base station caused by unison power stepping of the multiple reverse link code channels may increase. Thus, according to the present invention, when the reverse code channels 206 and 208 are added from the SU 114 to the base station 102, the base station 102 instructs the SU 114 to adjust to a smaller power control step size for the reverse link power control. As compared to operation illustrated in FIG. 2A wherein a single reverse link code channel 204 from the SU 114 to the base station 102 exists, using a smaller step size, depending on system conditions, may enhance the stability and capacity of the wireless communication system.

Finally, FIG. 2C illustrates operation between the SU 114 and the base station 102 when the data transmission requirements from the computer 118 to the base station 102 decrease. In such case, only two reverse link code channels 204 and 206 are required. When such change in operation occurs, the base station again adjusts to an appropriate power control step size. In an example of construction of the present invention, as specified in the ANSI TIA/EIA-95 standard which incorporates the enhancements based on the present invention, three differing power control step sizes are used. A first step size is 1.0 dB, a second step size is 0.5 dB and a third step size is 0.25 dB. In the above scenarios, immediately after the SU 114 is instructed by the base station 102 to adjust its power control step size, the SU 114 increases or decreases its reverse link transmit power by the power control step size upon receiving power control bits.

Figure 3:
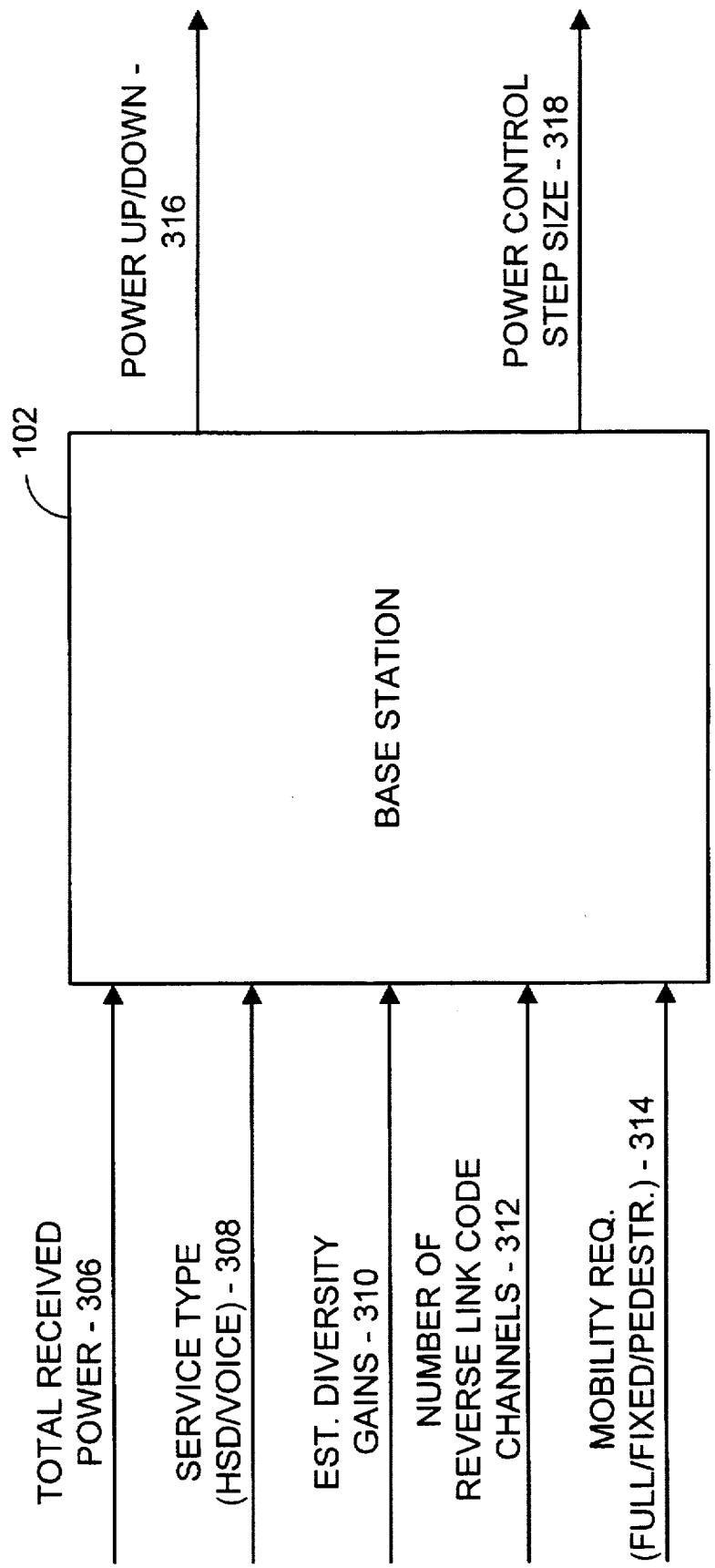
FIG. 3 is a diagram illustrating a base station implemented according to the present invention in which the reverse link transmit power is controlled based on various inputs.

FIG. 3 illustrates a particular embodiment of a base station 102 implemented according to the present invention in which the reverse link transmit power is controlled based on various inputs. The base station 102 operates in conjunction with the SUs to perform Closed Loop Power Control of the reverse link transmit power. The base station 102, based on a number of inputs, produces power control bits 316 and power control step size instructions 318 that are relayed to the SUs over respective forward links. The SUs receive such power control bits 316 and power control step size instructions 318 from the base station 102 and adjust the reverse link transmit power accordingly.

The various inputs may include total received power 306, service type 308, estimated diversity gains 310, number of reverse link code channels 312 and mobility requirement 314. Each of the inputs available at the base station 102 is used in determining the power control step size to manage the reverse link received power. For example, the base station 102 may determine and assign a larger step size for the SUs having a higher mobility requirement. Furthermore, for the SUs supporting HSD services, the base station 102 may assign a relatively smaller step size.

Figure 4:
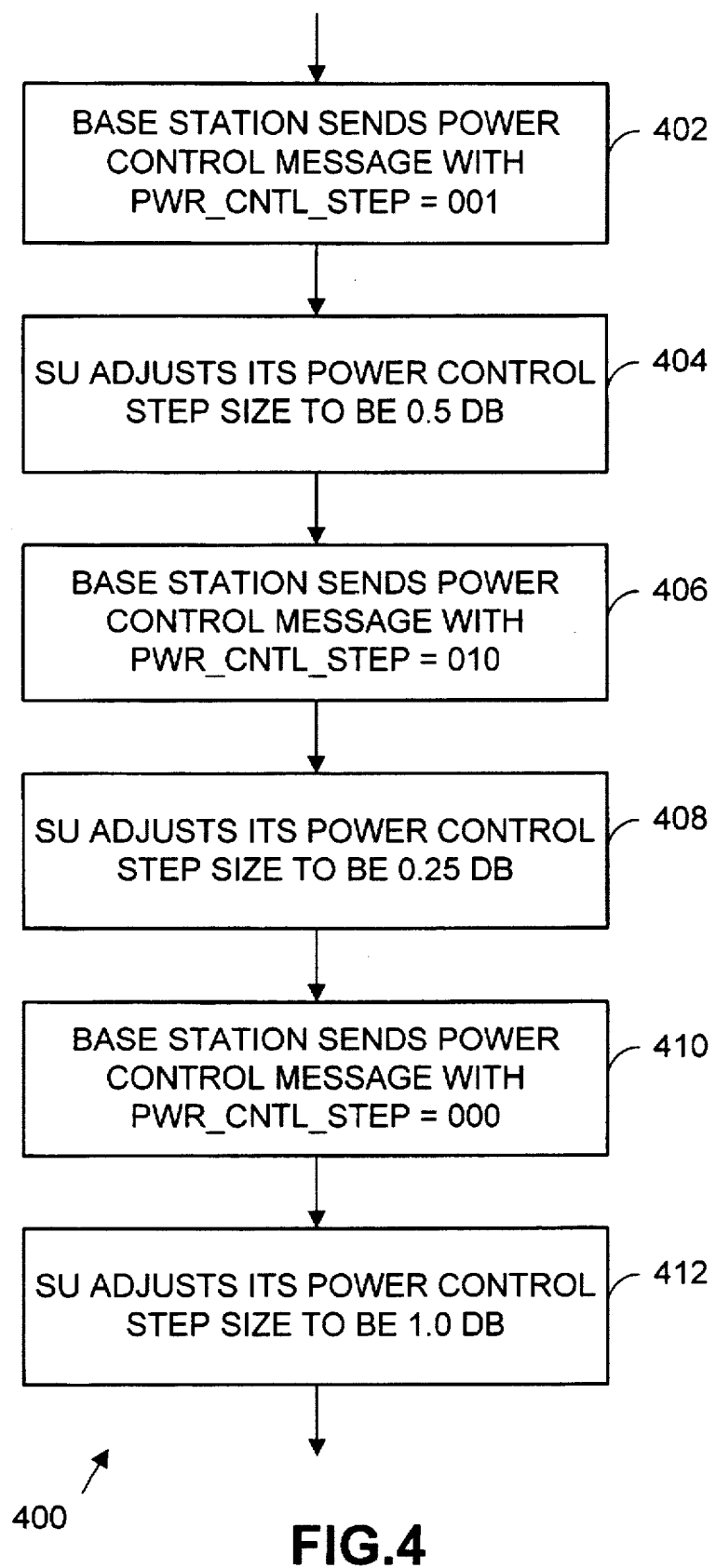
FIG. 4 is a flow diagram for adjusting the reverse link power control step size of a wireless communications system implemented according to the present invention.

FIG. 4 is a flow diagram illustrating operation 400 of a wireless communication system constructed according to the present invention in adjusting reverse link power control step sizes. Such operation is specific to a CDMA system operating according to the ANSI TIA/EIA 95 standard, which is an enhanced version of IS-95 based on the present invention. The steps illustrated in FIG. 4 are executed on assigned traffic channels during ongoing communications. Operation commences at step 402 wherein the base station sends a Power Control Message to the SU with the PWR_CNTL_STEP field set to '001'. Table 1 below illustrates the contents of the Power Control Message which is used to configure the reverse link power control step size of the SU. The Power Control Message may be sent from the base station to the SU any time when the SU is on the traffic channel.

TABLE 1

TIA/EIA - 95 Power Control Message

| Field | Length (bits) | Description |
| --- | --- | --- |
| MSG_TYPE ('00011000i') | 8 | Message type. The base station shall set this field to '00011000' |
| ACK_SEQ | 3 | Acknowledgement sequence number |
| MSG_SEQ | 3 | Message sequence number |
| ACK_REQ | 1 | Acknowledgement required indicator |
| ENCRYPTION | 2 | Message encryption indicator |
| PWR_CNTL_STEP | 3 | Power control step size |
| RESERVED | 4 | Reserved bits |

Contained within the Power Control Message is the PWR_CNTL_STEP field which indicates the step size to be employed. Table 2 below illustrates the PWR_CNTL_STEP field. The PWR_CNTL_STEP field may also be included in the General Handoff Direction Message according to the present invention. The base station thus can alter the power control step size of the SU when directing the SU to perform a handoff to another base station. In the future, the PWR_CNTL_STEP field may optionally be included in the Extended Channel Assignment Message and the Supplemental Channel Assignment Message, to provide more flexibility. The base station would then be able to alter the power control step size of the SU using the Extended Channel Assignment Message when assigning the traffic channel(s) to the SU. The base station would also be able to alter the power control step size of the SU using the Supplemental Channel Assignment Message when assigning or deassigning forward or reverse link supplemental code channels to the SU for HSD transmissions.

TABLE 2

TIA/EIA - 95 PWR_CNTL_STEP Field

| PWR_CNTL_STEP (binary) | Power Control Step Size (dB nominal) |
| --- | --- |
| 000 | 1 |
| 001 | 0.5 |
| 010 | 0.25 |
| All other PWR_CNTL_STEP values are reserved. | |

In response to the Power Control Message and the PWR_CNTL_STEP=001 field contained therein, the SU adjusts its power control step size to be 0.5 dB at step 404. Operation continues at the 0.5 dB step size until the SU receives Power Control Message with PWR_CNTL_STEP set to '010' at step 406. In response to the power control message, the SU adjusts its power control step size to be 0.25 dB at step 408. Operation then continues at the 0.25 dB step size until the SU receives still Power Control Message with PWR_CNTL_STEP set to '000' at step 410. In response to the Power Control Message, the SU adjusts its power control step size to be 1.0 dB at step 412.

Figure 5:
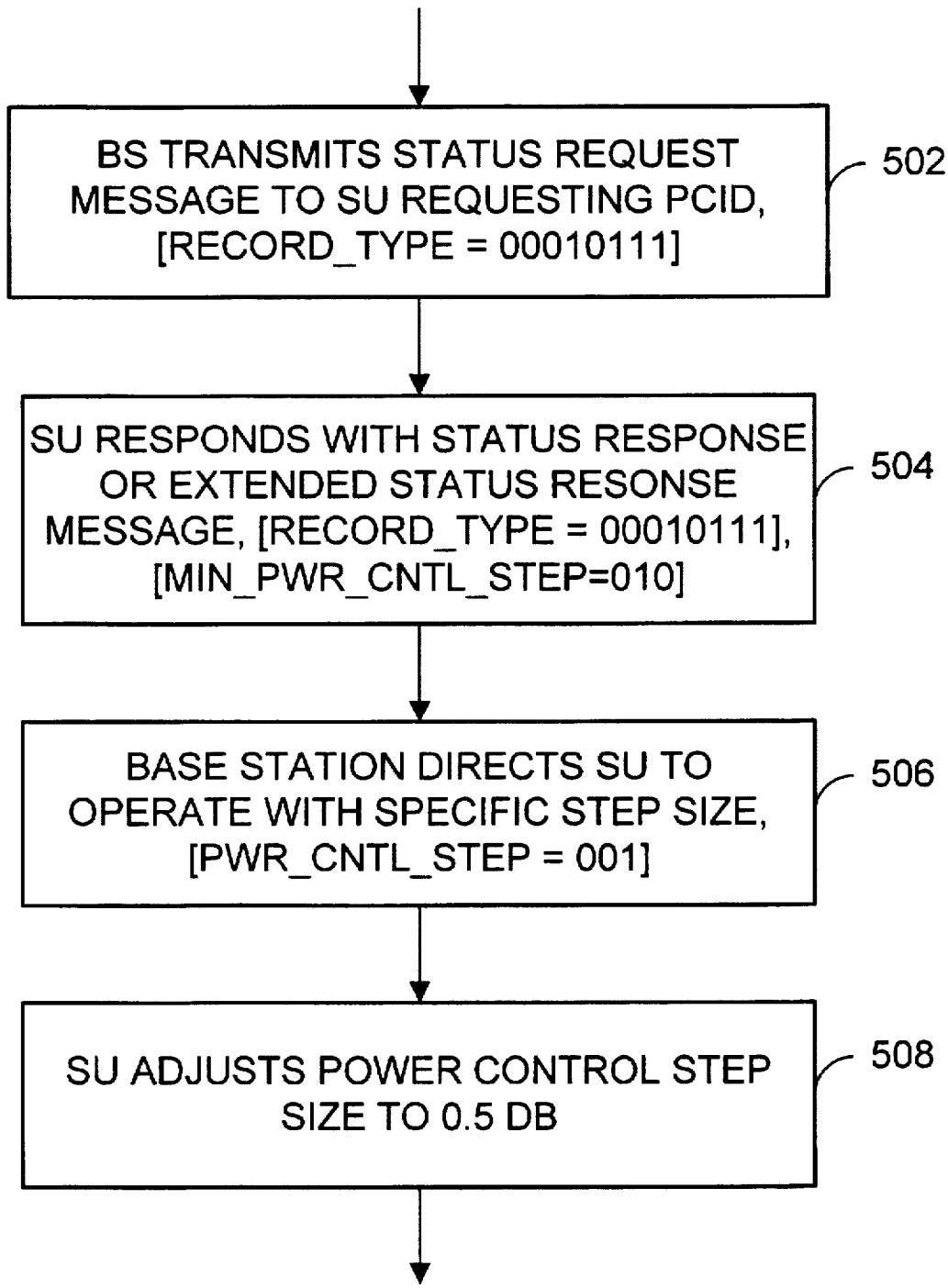
FIG. 5 is a flow diagram illustrating an example of operation of a wireless communication system implemented according to the present invention wherein a base station queries a subscriber unit for power control step size information and then directs the subscriber unit to adjust its reverse link according to a selected reverse link power control step size.

FIG. 5 is a flow diagram illustrating an example of operation 500 of a wireless communication system constructed according to the present invention wherein a base station queries a SU for power control step size information and then directs the SU to adjust its reverse link transmit power according to a selected reverse link power control step size. Operation commences at step 502 wherein the base station transmits a Status Request Message requesting the SU's Power Control Information Record (RECORD_TYPE=00010111). Table 3 below illustrates the Power Control Information Record. Within the Power Control Information Record, the MIN_PWR_$_{CNTL}$_STEP field indicates the minimum power control step size the SU supports. The SU also supports all standardized power control step sizes larger than its minimum supported power control step size.

TABLE 3

| TIA/EIA - 95 Power Control Information Record | | |
|---|---|---|
| Type-Specific Field | Length (bits) | Description |
| MIN_PWR_CNTL_STEP | 3 | Minimum power control step size |
| RESERVED | 5 | Reserved bits |

In response to the Status Request Message, the SU sends either a Status Response Message or an Extended Status Response Message with its power control information at step 504 (RECORD_TYPE=00010111). Once the base station has determined the capability of the SU, the base station may direct the SU to operate with a specific step size, e.g. by directing the SU with a Power Control Message with a PWR CNTL STEP=001 at step 506. In response the SU adjusts its power control step size to 0.5 dB at step 508. Once the power control step size has been adjusted, operation continues accordingly.

Furthermore, the base station may query the SU's power control step size information when the SU is idle or when the SU is on traffic channel. When the SU is idle monitoring the paging channel, the base station may send the Status Request Message on the paging channel and the SU would consequently reply with a Status Response Message or an Extended Status Response Message on the Access Channel. When the SU is on the traffic channel, the base station may send the Status Request Message on the Forward Traffic Channel and the SU would subsequently reply with a Status Response Message on the Reverse Traffic Channel.

Figure 6:
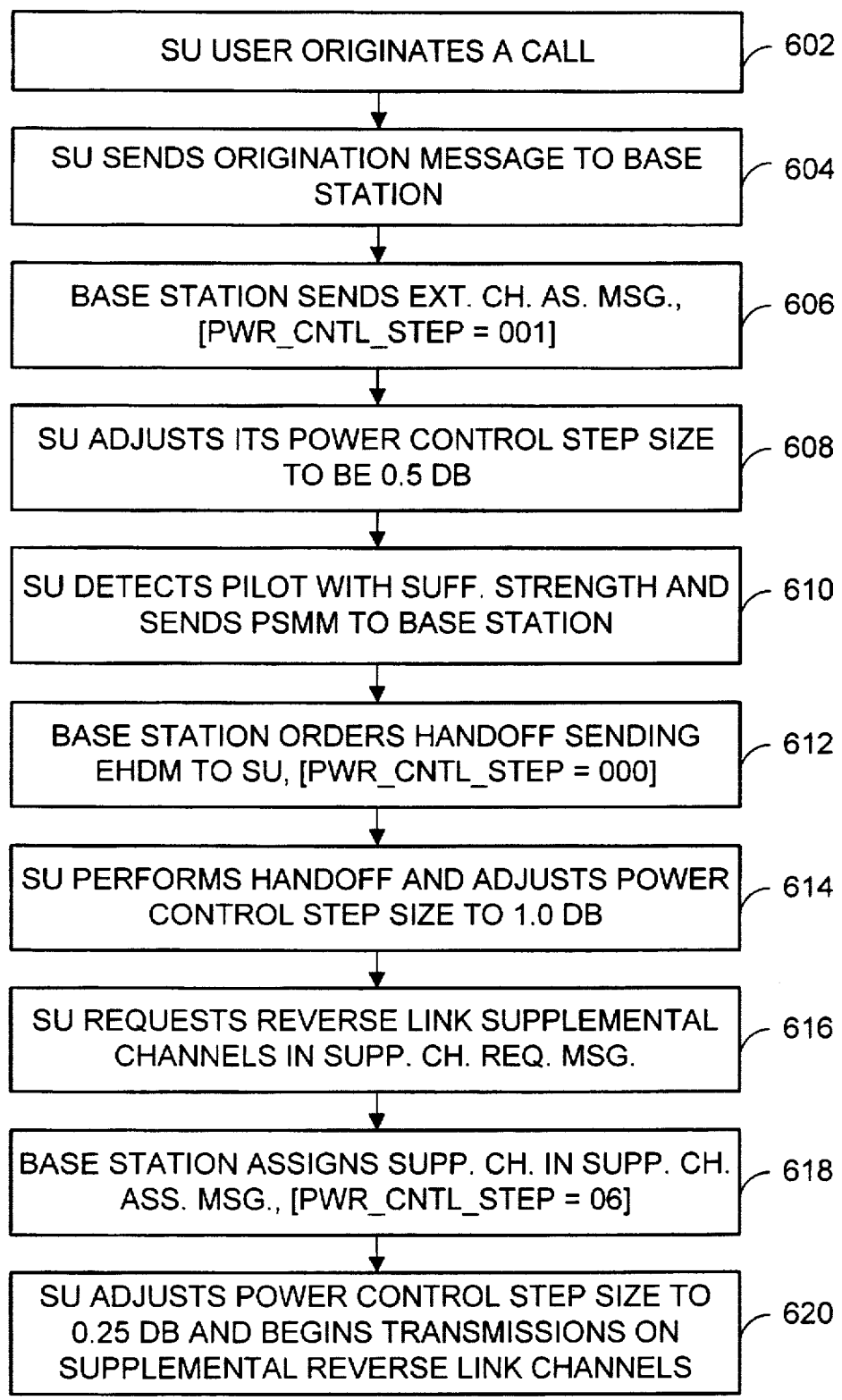
FIG. 6 is a flow diagram illustrating an example of operation of a wireless communication system constructed according to the present invention providing wireless service to a subscriber unit.

FIG. 6 is a flow diagram illustrating an example of operation 600 of a wireless communication system implemented according to the present invention in providing wireless service to an SU. At step 602, a user of an SU originates a call. Responding to the origination, the SU sends an origination message to the base station at step 604, requesting a traffic channel to service the call. In response, the base station sends an Extended Channel Assignment Message to the SU at step 606. The Extended Channel Assignment Message includes a PWR_CNTL_STEP=001 field, directing the SU to set its power control step size. In response, the SU adjusts its power control step size to be 0.5 dB at step 608.

From step 608, operation proceeds to step 610 wherein the SU detects a pilot signal with sufficient strength to meet a threshold and, in response, transmits a Pilot Strength Measurement Message (PSMM) to the base station, requesting handoff at step 610. Then, at step 612, the base station orders handoff of the SU, sending an General Handoff Direction Message to the SU with a PWR_CNTL_STEP=000. In response to the message, the SU adjusts its power control step size to 1.0 dB and the SU performs handoff as directed at step 614.

Then, in its operation, the SU requires a higher data rate on the reverse link, requesting reverse link supplemental channels from the base station in a supplemental Channel Request Message at step 616. The base station assigns the supplemental channels, indicating such to the SU via a supplemental Channel Assignment Message with a PWR_CNTL_STEP=010 at step 618. In response, the SU adjusts its power control step size to 0.25 dB and begins transmissions on the supplemental reverse link channels at step 620. As indicated, in the example, a smaller reverse link power control step size is used when the SU transmits on multiple reverse link code channels.

In view of the above detailed description of the present invention and associated drawings, other modifications and variations will now become apparent to those skilled in the art. It should also be apparent that such other modifications and variations may be effected without departing from the spirit and scope of the present invention as set forth in the claims which follow.

We claim:

1. A wireless communication system serving at least one subscriber unit operating within a respective service, the wireless communication system comprising:

a base station that provides wireless coverage within the service area, the base station establishing a forward link and a reverse link with the subscriber unit, communications transmitted to the subscriber unit on the forward link and communications received from the subscriber unit on the reverse link;

the base station, based upon system conditions and reverse link power control step sizes supported by the subscriber unit, selecting a reverse link power control step size for the subscriber unit;

the base station directing the subscriber unit to make adjustments to the power level of reverse link transmissions by a selected power control step size; and based upon the power level of reverse link transmissions from the subscriber unit received by the base station, the base station periodically directing the subscriber unit to increment or decrement the power level of reverse link transmissions by the selected power control step size in an attempt to cause the reverse link transmissions to arrive at the base station at a desired power level.

2. The wireless communication system of claim 1, the wireless communication system operating according to a Code Division Multiple Access mechanism.

3. The wireless communication system of claim 1, wherein the subscriber unit is capable of supporting multiple power control step sizes.

4. The wireless communication system of claim 1, wherein the base station queries the subscriber unit regarding its capabilities to support multiple power control step sizes by exchanging messages with the subscriber unit.

5. The wireless communication system of claim 1, wherein the system conditions include the power level and quality of the signal received by the base station from the subscriber unit.

6. The wireless communication system of claim 1, wherein the system conditions include the type of service being provided to the subscriber unit.

7. The wireless communication system of claim 1, wherein the system conditions include the mobility characteristics of the subscriber unit.

8. The wireless communication system of claim 1, wherein communications received by the base station from the subscriber unit are over a high speed data link comprised of a plurality of reverse link code channels.

9. The wireless communication system of claim 8, wherein the system conditions include the number of reverse link code channels received by the base station from the subscriber unit.

10. The wireless communication system of claim 1, wherein the base station directs the subscriber unit to adjust the power control step size via a power control message.

11. The wireless communication system of claim 1, wherein:
- a plurality of subscriber units communicate with the base station via respective forward links and respective reverse links;
- for each of the plurality of subscriber units, based upon system conditions and reverse link power control step sizes supported by the subscriber unit, the base station selecting a respective power control step size for the subscriber unit;
- for each of the plurality of subscriber units, the base station directing the subscriber unit to make adjustments to the power level of respective reverse link transmissions by a respective selected power control step size; and
- for each of the plurality of subscriber units, the base station periodically directing the subscriber unit to increment or decrement its respective reverse link power transmission level by the respective selected power control step size.

12. The wireless communication system of claim 11, wherein the system conditions include the types of services being provided to the plurality of subscriber units.

13. The wireless communication system of claim 11, wherein the system conditions include the mobility characteristics of the subscriber units.

14. The wireless communication system of claim 11, wherein the system conditions include the power level and quality of the signals received by the base station from the subscriber units.

15. The wireless communication system of claim 11, wherein system conditions include the number of reverse link code channels received by the base station from the subscriber units.

16. A subscriber unit for use with a wireless communication system comprised of at least one base station that provides wireless coverage to the subscriber unit within a service area, the subscriber unit comprising of:
- a processing unit;
- a radio transceiver unit coupled to the processing unit that communicates with the base station on both a forward link and a reverse link, communications received by the subscriber unit from the base station on the forward link and communications transmitted by the subscriber unit to the base station on the reverse link, the radio transceiver unit capable of incrementing or decrementing the power level of transmissions on the reverse link by a plurality of supported power control step sizes;
- the subscriber unit receiving a selected power control step size from the base station that was selected by the base station based upon system conditions and the plurality of power control step sizes supported by the subscriber unit; and
- the subscriber unit periodically incrementing or decrementing the power level of transmissions on the reverse link by the selected reverse link power control step, the incrementing or decrementing performed in an attempt to cause the transmissions on the reverse link to arrive at the base station at desired power levels.

17. The subscriber unit of claim 16, the wireless communication system operating according to a Code Division Multiple Access mechanism.

18. The subscriber unit of claim 16, wherein the system conditions include the power level and quality of the signal received by the base station from the subscriber unit.

19. The subscriber unit of claim 16, wherein the system conditions include the type of services being provided to the subscriber unit by the base station.

20. The subscriber unit of claim 16, wherein the system conditions include the mobility characteristics of the subscriber unit.

21. The subscriber unit of claim 16, wherein communications received by the base station from the subscriber unit are over a high speed data link comprised of a plurality of reverse link code channels.

22. The subscriber unit of claim 21, wherein the system conditions include the number of reverse link code channels comprising the high speed data link for communications received by the base station from the subscriber unit.

23. The subscriber unit of claim 16, wherein the base station directs the subscriber unit to adjust the power control step size via a power control message.

24. The subscriber unit of claim 16, wherein the base station directs the subscriber unit to adjust the power control step size via general handoff direction messages, extended channel assignment messages and supplemental channel assignment messages.

25. The wireless communication system of claim 11, wherein:
- the wireless communication system provides coverage to subscriber units over a plurality of service areas, each of the plurality of service areas served by at least one base station; and
- at least base station directs a subscriber unit to adjust its power control step size during handoff between the plurality of service areas.

26. The subscriber unit of claim 16, wherein the subscriber unit is directed by a base station to adjust its power control step size during handoff to another service area.

27. The subscriber unit of claim 16, wherein the subscriber unit autonomously adjusts its power control step size based on system conditions.

28. A method of operating a wireless communication system that serves at least one subscriber unit operating in a service area, the method comprising:
- establishing a forward link and a reverse link between a base station and a subscriber unit, communications transmitted to the subscriber unit from the base station on the forward link and communications transmitted to the base station from the subscriber unit on the reverse link;

selecting, by the base station, a power control step size for the subscriber unit based upon system conditions and power control step sizes supported by the subscriber unit;

the base station directing the subscriber unit to use the selected power control step size for subsequent adjustments of the power level of transmissions on the reverse link; and the base station periodically directing the subscriber unit to increment or decrement the power level of transmissions on the reverse link by the selected power control step size to cause the transmissions on the reverse link to arrive at the base station at desired power levels.

29. The method of claim 28, further comprising:

operating the wireless communication system according to a Code Division Multiple Access mechanism.

30. The method of claim 28, wherein the system conditions include the power level and quality of the signal received by the base station from the subscriber unit.

31. The method of claim 28, wherein the system conditions include the type of service being provided to the subscriber unit.

32. The method of claim 28, wherein the system conditions include the mobility characteristics of the subscriber unit.

33. The method of claim 28, wherein communications received by the base station from the subscriber unit are over a high speed data link comprised of a plurality of reverse link code channels.

34. The method of claim 33, wherein the system conditions include the number of reverse link code channels comprising the high speed data link for communications received by the base station from the subscriber unit.

35. The method of claim 28, wherein the base station directs the subscriber unit to adjust the power control step size via a power control message.

36. The method of claim 28, further comprising:

the base station communicating with a plurality of subscriber units via respective forward and reverse links; and the wireless communication system dynamically directing each subscriber unit to adjust its respective reverse link power level based upon system conditions.

37. The method of claim 35, further comprising:

the wireless communication system dynamically directing each subscriber unit to adjust its respective reverse link power level by individually determined power control step sizes based upon system conditions.

38. A base station that supports wireless communications with a subscriber unit, the base station comprising:

a subscriber unit interface that supports forward link transmissions to the subscriber unit and the receipt of reverse link transmissions from the subscriber unit;

a reverse link power control step size determination unit that, based upon power control step size capabilities of the subscriber unit and system conditions, determines a reverse link power control step size to be employed by the subscriber unit;

the base station directing the subscriber unit to increment or decrement the power of reverse link transmissions by the reverse link power control step size; and based upon the power level of reverse link transmissions from the subscriber unit received by the base station, the base station periodically directing the subscriber unit to increment or decrement the power level of reverse link transmissions by the selected power control step size in an attempt to cause the reverse link transmissions to arrive at the base station at a desired power level.

* * * * *

(12) EX PARTE REEXAMINATION CERTIFICATE (5384th)
United States Patent
Ali et al.

(10) Number: US 5,896,411 C1
(45) Certificate Issued: May 30, 2006

(54) ENHANCED REVERSE LINK POWER CONTROL IN A WIRELESS COMMUNICATION SYSTEM

(75) Inventors: Farhan Ali, Escondido, CA (US); Alberto Gutierrez, Plano, TX (US); Kim Chang, Richardson, TX (US); Chenhong Huang, Plano, TX (US); Serge Manning, Plano, TX (US)

(73) Assignee: Nortel Networks Limited, Brampton (CA)

Reexamination Request:
No. 90/006,575, Mar. 25, 2003

Reexamination Certificate for:
Patent No.: 5,896,411
Issued: Apr. 20, 1999
Appl. No.: 08/998,542
Filed: Dec. 26, 1997

Related U.S. Application Data

(60) Provisional application No. 60/045,564, filed on May 5, 1997.

(51) Int. Cl.
*H04B 1/69* (2006.01)

(52) U.S. Cl. ................ 375/130; 455/522; 455/69
(58) Field of Classification Search ............ 455/69, 455/126, 522, 572; 370/335
See application file for complete search history.

(56) References Cited

U.S. PATENT DOCUMENTS

| | | | | |
|---|---|---|---|---|
| 5,604,730 A | * | 2/1997 | Tiedemann, Jr. | 370/252 |
| 5,648,955 A | * | 7/1997 | Jensen et al. | 370/252 |
| 5,794,142 A | * | 8/1998 | Vanttila et al. | 455/419 |
| 5,828,660 A | * | 10/1998 | Baum et al. | 370/330 |
| 6,104,918 A | * | 8/2000 | Saario et al. | 455/126 |

OTHER PUBLICATIONS

Lee et al., Closed–loop Power Control in CDMA systems, IEE Proc.–Commun., vol. 143, No. 4, pp. 231–239, Aug. 1996.*

Chockalingam et al., Closed Loop Power Control Performance ina cellular CDMA System, IEEE Proceedings of Asilomar–29, pp. 362–366, 1996.*

Kim et al., The performance analysis of reverse power control for DS/CDMA system, IEEE ICPWC'97, pp. 215–218, 1997.*

Su et al., Reverse–Link Power Control Strategies for CDMA Cellular, IEEE, pp. 461–465, 1995.*

TIA/EIA/IS–95–A +TSB74, Feb. 27, 1996.*

TIA/EIA Interim Standard, Feb. 1997.*

Chang et al., Design of Power Control Mechanism with PCM Realization for the Uplink of a DS–CDMA Cellular Mobile Radio System,IEEE Transactions on Vehicular Technology, vol. 45, No. 3, pp. 522–530, Aug. 1996.*

* cited by examiner

*Primary Examiner*—Shuwang Liu

(57) ABSTRACT

An enhanced mechanism for the reverse link power control in a wireless communication system, especially for high speed data applications and fixed wireless communication applications, dynamically adjusts the power control step size of the reverse link power control. The power control step size is dynamically adjusted based on various factors including types of service, number of reverse supplemental code channels, total received power at the base station, estimated diversity gain and required mobility, among others. The system which includes stationary infrastructure, can query a subscriber unit's capability in the support of a pre-defined set of power control step sizes before assigning it to the subscriber unit. Furthermore, the subscriber unit may decide its optimized power control step size based on certain feedbacks from the system. In a specific embodiment, enhancement to the ANSI EIA/TIA-95 system is provided such that it supports a variable subscriber unit power control step size and associated signaling in accord with this invention.

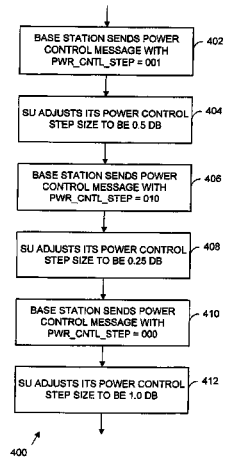

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1–38 is confirmed.

* * * * *